(12) United States Patent
Ho et al.

(10) Patent No.: US 11,976,958 B2
(45) Date of Patent: May 7, 2024

(54) CAPACITIVE LIQUID LEVEL SENSOR AND LIQUID SENSOR ASSEMBLY

(71) Applicant: CHARLES AUSTEN PUMPS LTD., Surrey (GB)

(72) Inventors: King Ho, Surrey (GB); William E. Shepherd, Surrey (GB)

(73) Assignee: CHARLES AUSTEN PUMPS LTD., Surrey (GB)

(*) Notice: Subject to any disclaimer, the term of this patent is extended or adjusted under 35 U.S.C. 154(b) by 422 days.

(21) Appl. No.: 17/312,303

(22) PCT Filed: Dec. 12, 2019

(86) PCT No.: PCT/GB2019/053524
§ 371 (c)(1),
(2) Date: Jun. 9, 2021

(87) PCT Pub. No.: WO2020/120971
PCT Pub. Date: Jun. 18, 2020

(65) Prior Publication Data
US 2022/0026256 A1 Jan. 27, 2022

(30) Foreign Application Priority Data
Dec. 13, 2018 (GB) ...................... 1820355

(51) Int. Cl.
*G01F 23/26* (2022.01)
*G01F 23/263* (2022.01)

(52) U.S. Cl.
CPC .......... *G01F 23/268* (2013.01); *G01F 23/266* (2013.01)

(58) Field of Classification Search
CPC ............................ G01F 23/266; G01F 23/268
See application file for complete search history.

(56) References Cited

U.S. PATENT DOCUMENTS

| 4,674,329 A | 6/1987 | Mulder |
| 5,507,178 A | 4/1996 | Dam |
| 5,929,754 A * | 7/1999 | Park ...................... G01F 23/263 73/304 C |

(Continued)

FOREIGN PATENT DOCUMENTS

| JP | 2005147779 A | 6/2005 |
| JP | 2006105953 A | 4/2006 |

OTHER PUBLICATIONS

International Search Report and Written Opinion in related application PCT/GB2019/053524 dated Feb. 27, 2020.

(Continued)

*Primary Examiner* — Andre J Allen
(74) *Attorney, Agent, or Firm* — Patterson + Sheridan, LLP

(57) ABSTRACT

A capacitive liquid level sensor (1). The sensor comprises a sensor body in the form a tongue with a freely depending portion (3) extending to a distal tip (6) at its lowermost end. A set of spaced capacitive electrodes (7) extend along the tongue towards the distal tip. In use, when the distal tip (6) of the tongue is immersed in a body of liquid, the capacitance between the electrodes (7) changes depending on the depth of the body of liquid. The width of the tongue increases in the downward direction at least for part of the bottom half of the freely depending part of the tongue.

9 Claims, 5 Drawing Sheets

(56) References Cited

U.S. PATENT DOCUMENTS

| | | | | |
|---|---|---|---|---|
| 7,064,560 B2 * | 6/2006 | Yamamoto | ............ | G01F 23/268 |
| | | | | 73/304 C |
| 7,114,391 B2 * | 10/2006 | Sasaki | ................... | G01F 23/266 |
| | | | | 73/304 C |
| 7,600,424 B2 * | 10/2009 | Sasaki | ................... | G01F 23/266 |
| | | | | 73/304 C |
| 7,735,354 B2 * | 6/2010 | Yamamoto | ............ | G01N 25/005 |
| | | | | 73/61.41 |
| 7,959,863 B2 * | 6/2011 | Yamamoto | ............ | G01F 23/268 |
| | | | | 422/68.1 |
| 10,697,818 B2 * | 6/2020 | Thibault | ............... | G01D 5/2412 |
| 10,969,264 B2 * | 4/2021 | Ihle | ........................ | G01F 23/266 |
| 2007/0000319 A1 | 1/2007 | Sasaki et al. | | |
| 2011/0120219 A1 | 5/2011 | Barlesi et al. | | |

OTHER PUBLICATIONS

Combined Search and Examination Report in related application GB1820355.4 dated Jun. 10, 2019.

* cited by examiner

CAPACITIVE LIQUID LEVEL SENSOR AND LIQUID SENSOR ASSEMBLY

BACKGROUND

Field

The present invention relates to a capacitive liquid level sensor and liquid sensor assembly.

Description of the Related Art

The sensor has been designed particularly to measure the level of condensate in a tank. However, the sensor has applications in other situations where it is necessary to measure the level of a liquid.

Condensate tanks are widely used in air conditioners, dehumidifiers, refrigerators, condensing boilers and the like. They are typically located below the tank to receive the condensate water from the main appliance.

As the condensate collects in the tank and the level rises above an upper threshold, the sensor emits a signal which is interpreted by a controller which will then activate a pump in order to drain the tank. The pump is deactivated when the level falls below a lower threshold. Accurate measurement of the threshold conditions is necessary in order to reduce pump wear, power consumption and noise.

Traditionally, float sensors have been used to detect the threshold levels. However, these are bulky and are prone to sticking. We have therefore used a thermister based sensor. Despite the fact that this solves some of the problems of a float sensor, it still has a number of drawbacks. It remains relatively bulky and requires relatively high levels of power.

We have therefore been developing a capacitive sensor which can be smaller and requires less power. Further, it is sensitive to varying levels, rather than the float and thermister sensors which simply detect when a threshold is reached by triggering an on/off switch. A capacitive sensor therefore allows tracking of the rate of fill between the levels and allows the possibility for alarms to be provided at various different levels.

As the condensate level in the tank drops, pockets of condensate tend to detach from the main body of condensate due to capillary action and are retained in gaps between the capacitive sensor and the surrounding mechanical parts. The pockets of liquid are inconsistent in size and are unpredictable. As a result of this, the sensor readings become inaccurate. For example, the presence of retained liquid may cause a sensor to record a signal indicating that liquid remains present even when the main body of liquid has dropped below the lower threshold. This results in the pump running on unnecessarily. On the other hand, if the sensor has been calibrated while trapped liquid is present, this can result in the sensor later reporting that the liquid level is lower than it is, in which case the pump will stop to soon.

One way to address this problem is to space the sensor from any surrounding mechanical parts. However, in most applications there is a commercial incentive to reduce the size of the collection tank permitting it to be fitting in small spaces. Therefore, not only does the sensor itself need to be small, there is also a need for it to be installed in close proximity to other parts such as tank walls, brackets or protective shrouds.

There is always some water retained in the collection tank at the level below the lower threshold as it is undesirable to completely empty the tank as this would require running the pump with a mixture of liquid and air passing through which is noisy and inefficient. However, with smaller tanks, the volume of this retained water becomes proportionately larger as a percentage of the total tank volume thereby exacerbating the problem of inaccurate measurement. It has been found that the clinging water problem occurs when the gap between the sensor and adjacent parts is 6 mm or less. A solution is therefore required which can deal with the problem of the clinging water while allowing the sensor to be within 6 mm of the surrounding mechanical parts.

SUMMARY

According to the present invention, there is provided a capacitive liquid level senor according to claim 1.

When the sensor is placed in close proximity to a surrounding part, this will generally have a vertical wall. The increasing width of the tongue in the downward direction therefore creates a gap which narrows in the downward direction. As the liquid level in the main body of liquid drops, any liquid which is left in this gap tends to be pulled downwards to the narrowest part of this gap and under capillary action. Thus, rather than being trapped at an uncontrollable location along the length of the tongue, any trapped liquid is caused to collect in a better defined and controllable position.

The sensor is configured such that the electrodes terminate short of the widest part of the freely depending portion of the tongue. With such an arrangement, any trapped liquid can be drawn to a location which is beneath the ends of the electrodes such that it does not interfere with the level sensing. Further, the sensor may be positioned such that the widest part of the sensor is below the lower threshold of the tank in which it is placed so that any trapped liquid is drawn into the main body of liquid.

The tongue may have conical or other "three dimensional" shape and may have the increasing width in either one or two dimensions. However, preferably, the tongue is flat. Such a flat structure reduces the amount of surface area of the tongue in proximity to a surrounding structure. Preferably, the tongue is a printed circuit board (PCB). This allows the electrodes to be mounted in a PCB and all other electrical connections required to the sensor can be made in manner which takes advantage of the low cost mass production techniques of PCB fabrication. The PCB can conveniently support the electronical circuitry required for the sensor. Further, PCB's are typically made with fibreglass which is mechanically robust and does not absorb moisture.

The tongue may be mounted, for example by being adhered to the surrounding structure. However, preferably, the tongue has a connecting portion at the end opposite to the distal end by which it can be mounted. Preferably, the connecting portion is provided with electrical contacts as this allows an easy way for the tongue to be mounted and does so in conjunction with a PCB in a manner which provides a simple way of mounting of the necessary elements for the sensor and provides an easy connection for these.

Because the sensor can be used in relatively small spaces, it is suitable for use when the tongue is surrounding by a shroud. This provides mechanical protection for the sensor body. For example, the sensor can be used when the smallest gap between the tongue and the closest adjacent component is less than 6 mm.

According to a second aspect of the present invention, there is provided a liquid sensor assembly according to claim 7. This provides the advantage referred to above concerning the narrowing of the gap as the liquid drops. The narrowing gap may be provided by having an inclined part of the housing, or by tilting the senor with respect of the housing. However, preferably, the decreasing gap is provided by a sensor according to claim 1.

The housing may be provided with a shroud, but would also be part of a tank and/or the lid. Preferably the gap between the sensor and the housing at its narrowest part is 6 mm or less.

BRIEF OF DESCRIPTION OF THE DRAWINGS

An example of a sensor in accordance with the present invention will now be described with reference to the accompanying drawings, in which.

DETAILED DESCRIPTION

Figure 1:
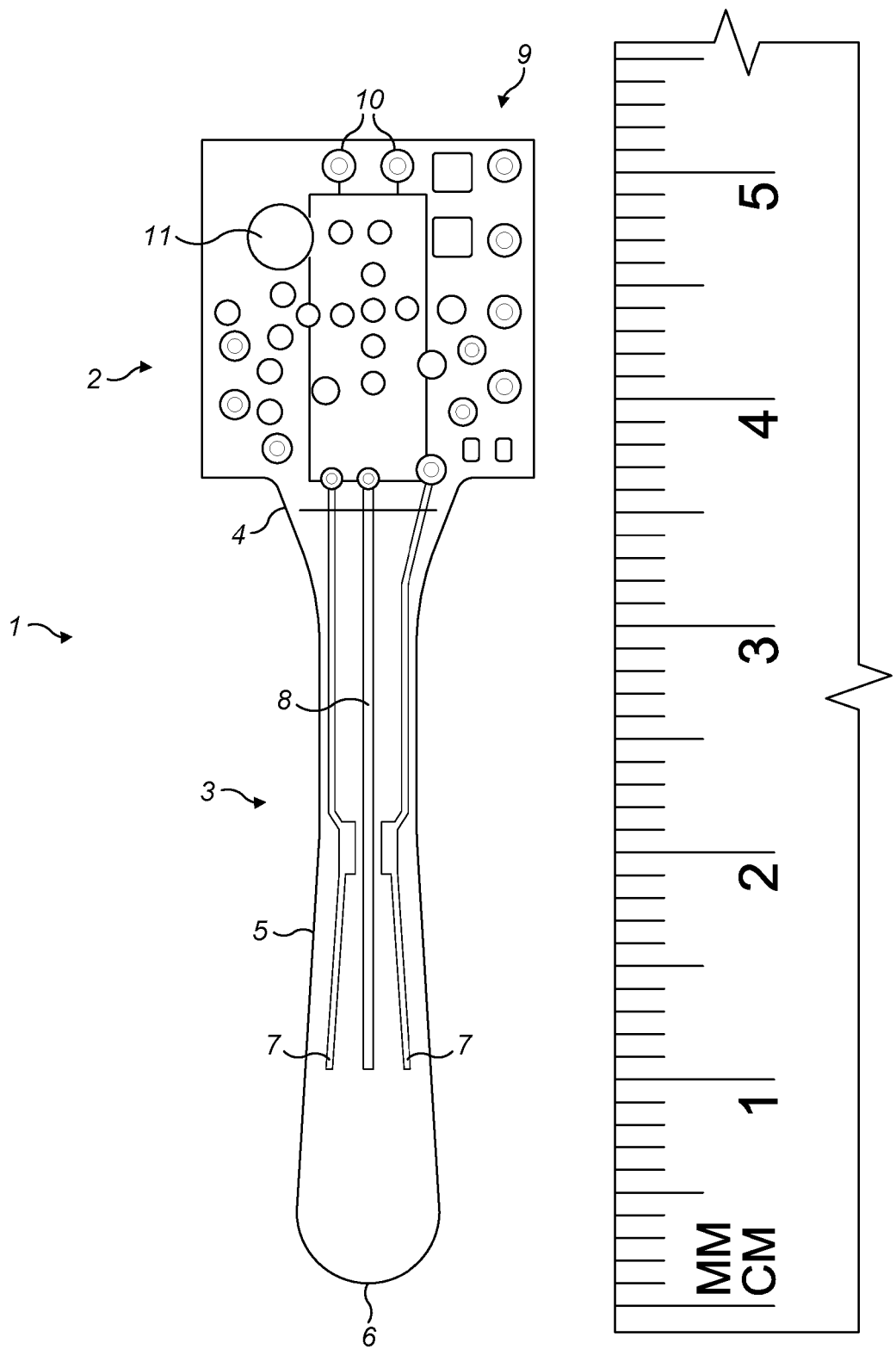
FIG. 1 is a plan view of the sensor with a ruler for scale.
Figure 2:
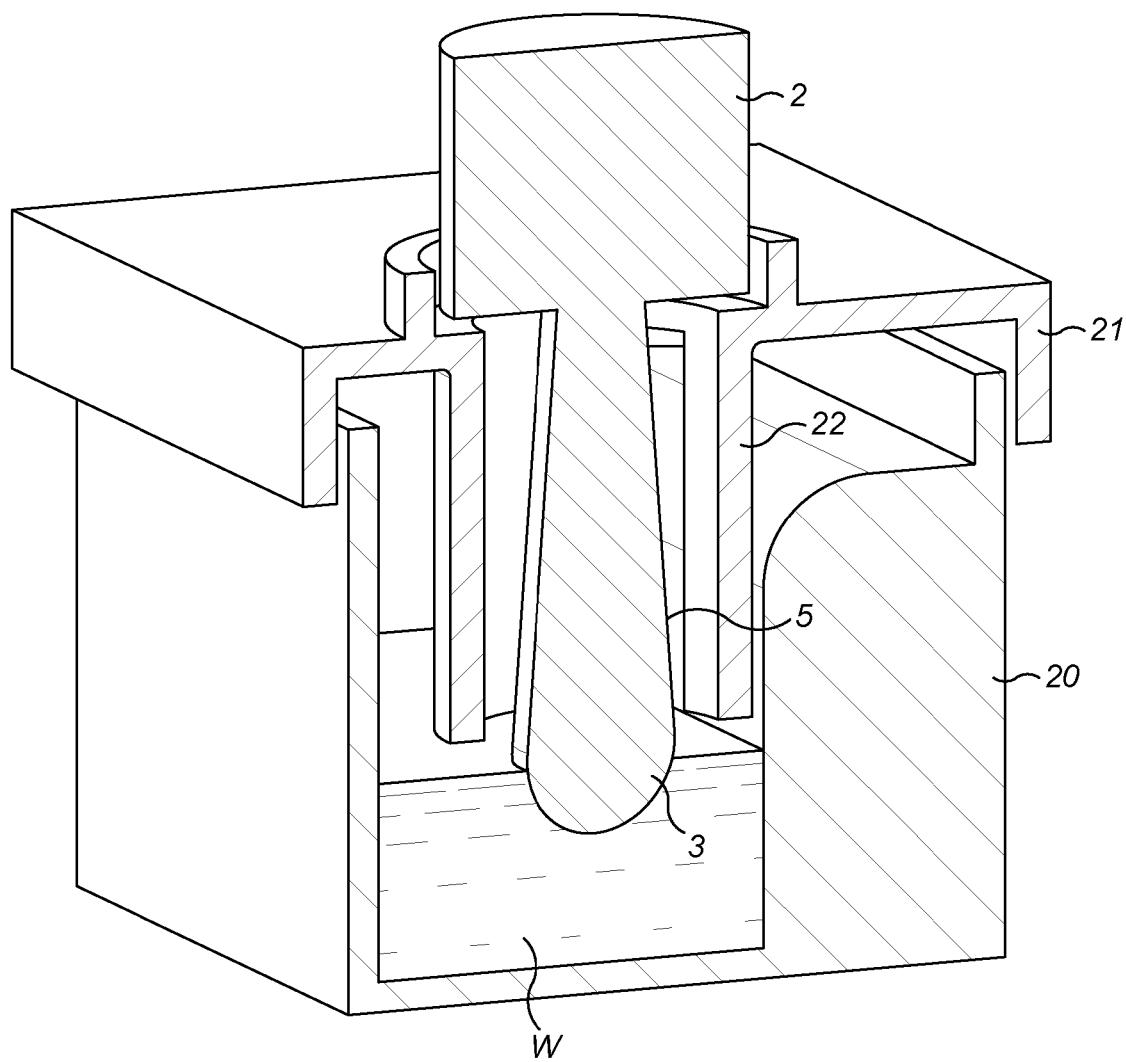
FIG. 2 is a partial schematic view of an assembly including the sensor.

The sensor shown in FIGS. 1 and 2 is formed on a flat printed circuit board. However, it could be formed on other substrates, whether flat or otherwise.

Broadly speaking, the sensor 1 is divided into a mounting part 2 via which the sensor 1 is mounted to a surrounding house and a depending part 3 which depends downwardly from the mounting part. As in apparent from FIG. 2, the mounting part 2 is in a form of a cylindrical over mould which houses and seals circuitry in the upper part of the sensor 1. It is formed of an elastomer such that it can provide a compression fit with the surrounding mount. As seen in the figures, there is a well-defined neck 4 which represents a narrowed part in the depending portion immediately below the mounting portion 2. Extending from the neck is a main portion 5 where the width increases slightly for the majority of the length of the depending portion. The main portion 5 terminates in a distal tip 6 which is here shown having a semi-circular configuration but can equally be flat, such that a taper of the main portion extends all the way to the distal tip. Alternatively, it may have any other configurations such as a pointed or recessed configuration.

A set of electrodes 7 extend along the main portion 5 and optionally diverge with respect to one another following the taper of the main portion 5. These terminate well short of the distal tip 6 at a location which is approximately a quarter of the way along the depending portion beginning from the distal end. The effect of this is described below.

The electrodes 7 are connected to the mounting portion 2 by a conductive track 8. This leads into the mounting portion 2 which is provided with the necessary circuitry 9 required of the sensor, as well as being provided with electrical connectors 10 to transmit power to the sensor and signals from the sensor. It is also provided with a hole 11 to provide strain relief for an attached cable.

The sensor 1 as described above is mounted into a tank as shown in FIG. 2. The tank comprises a main body 20 and a lid 21 from which a shroud 22 extends.

The sensor 1 is mounted on the lid 21 with a depending portion 3 depending downwardly from the lid and the distal tip being shown immersed in a body of water W held in the bottom of the tank. The capacitance between the electrodes 7 varies with the depth of immersion of the sensor 1 in the body of water W.

The exact nature of the tank is unimportant to the present invention indeed, one of the important features of the invention is that it allows the sensor to be a retrofit in many types of existing tank. The reason why this is so is set out below.

Figure 3:
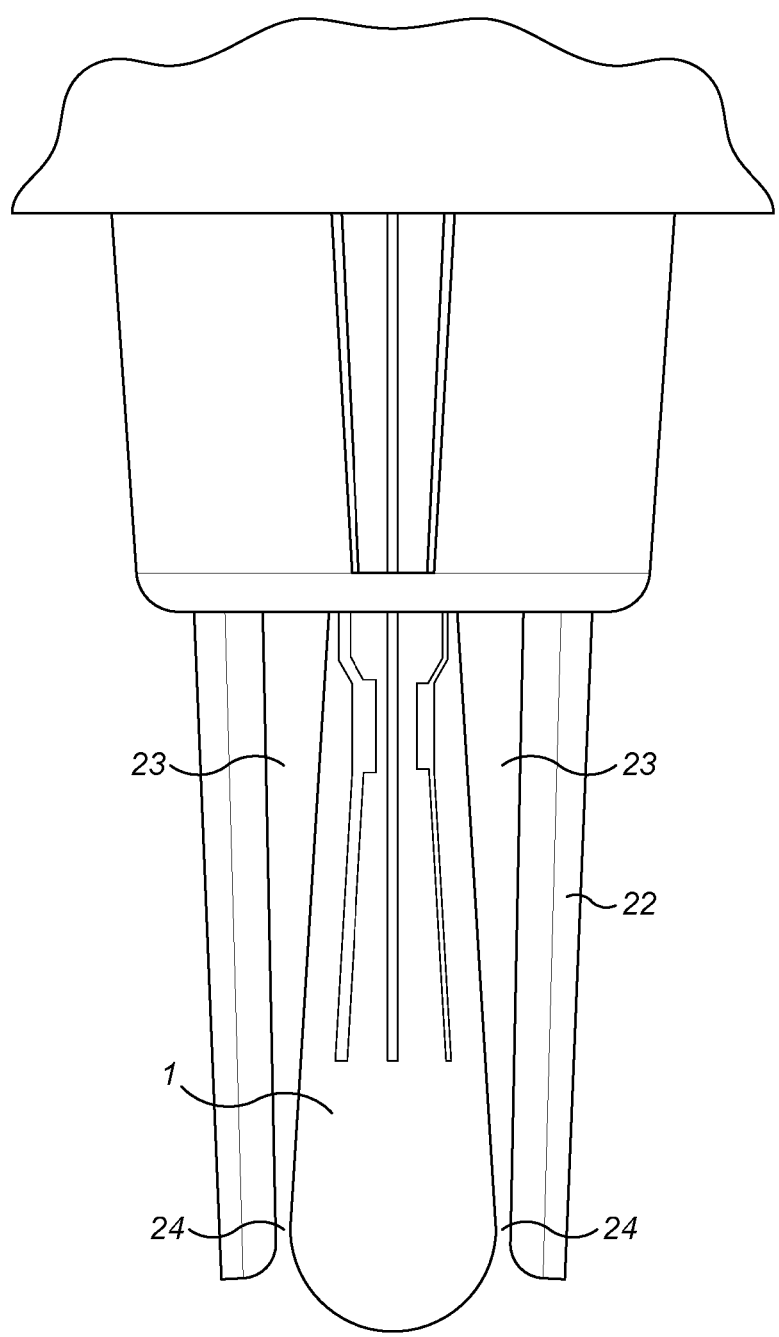
FIG. 3 is a front view of the sensor and surrounding housing according to the present invention.
Figure 4:
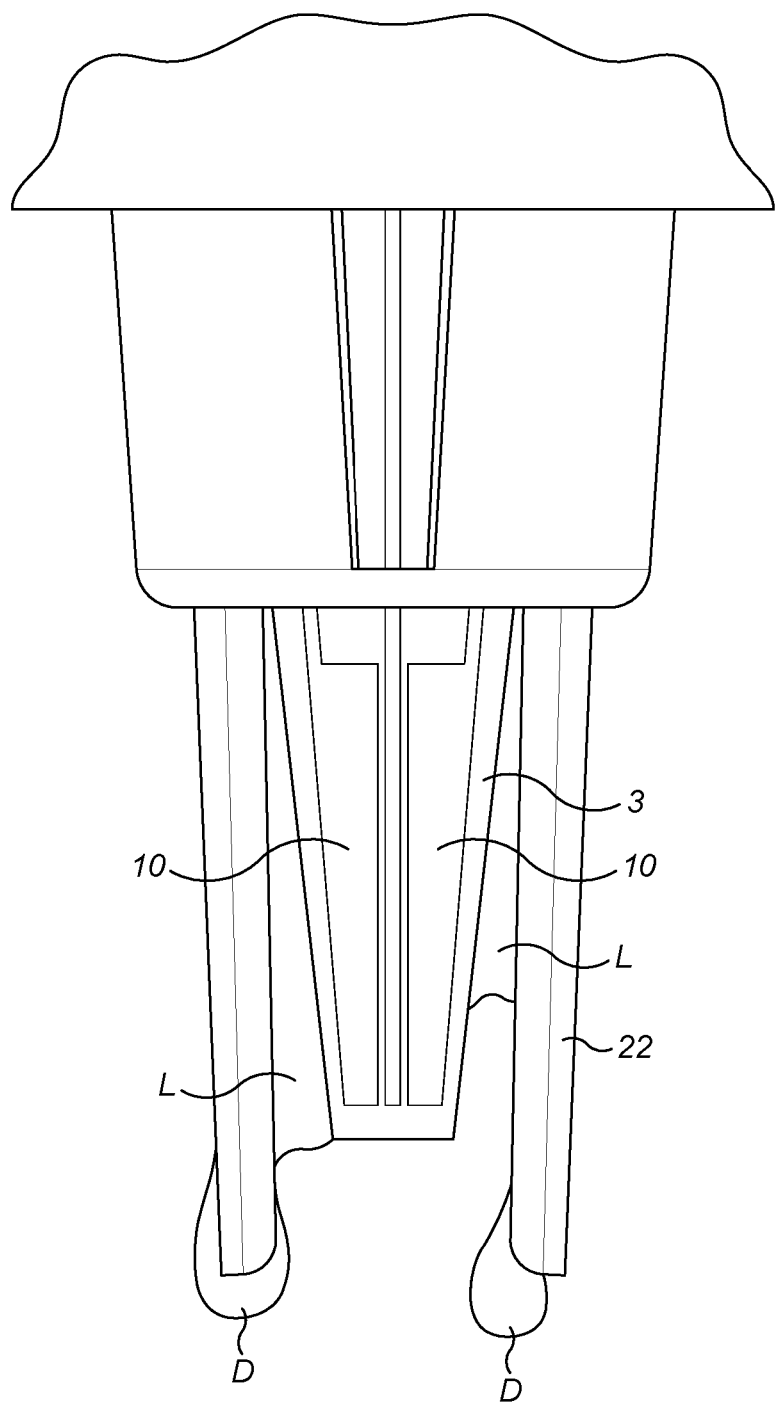
FIGS. 4 and 5 are views similar to FIG. 3 showing sensors which are not in accordance with the invention by way of comparison with FIG. 3.
Figure 5:
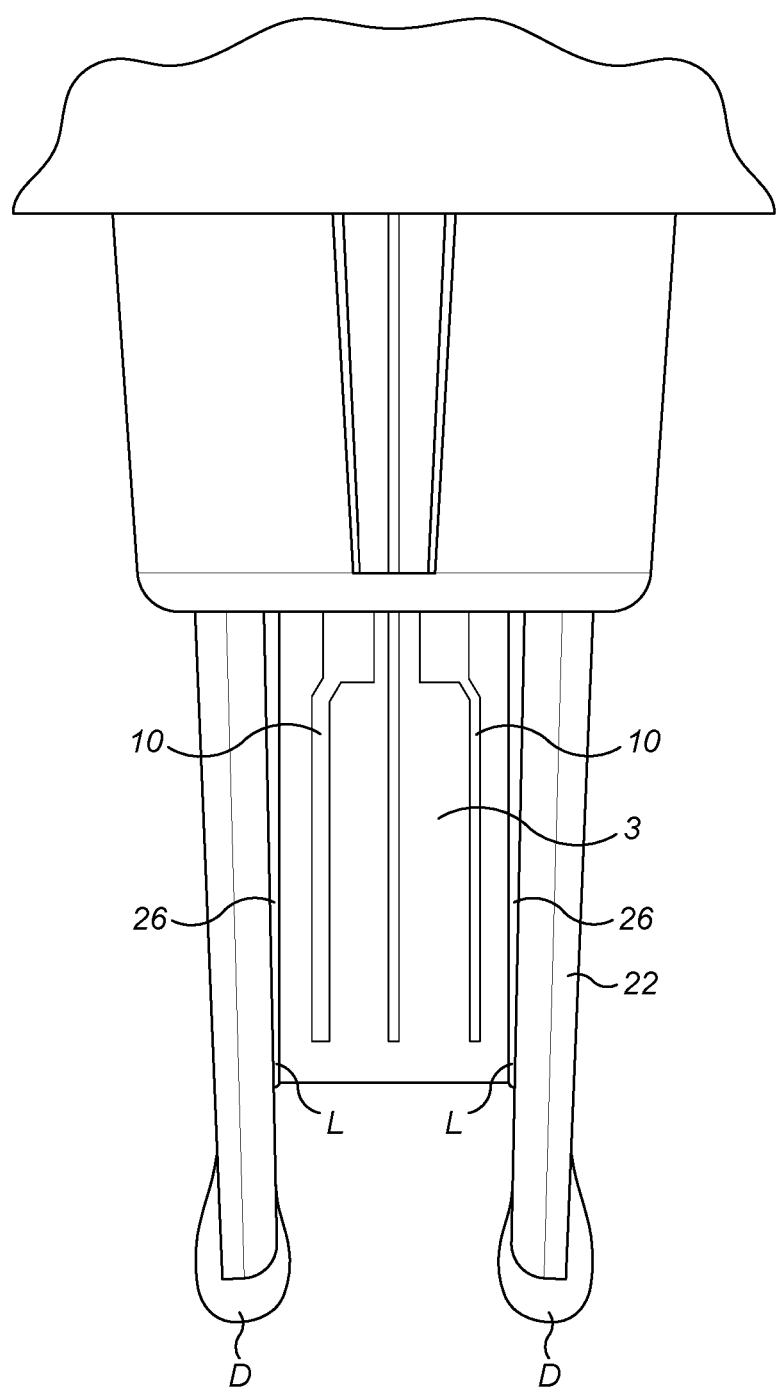

The technical effect provided by the present invention will be appreciated from a comparison of FIG. 3 with FIGS. 4 and 5. FIG. 3 is in accordance with the present invention as the sensor 1 increases in width in the downward direction towards the distal end. When this is placed within a thermal shroud 22 with parallel sides, gaps 23 are created on either side of the sensor 1 which decrease in width in a downward direction. As a result of this capillary forces cause the liquid to flow down towards the narrowest part 24 of the gaps 23.

FIG. 2 shows the main body of liquid W at a location corresponding to the lowermost threshold within the tank. It will be appreciated that this level is approximately the same as the level of the trapped liquid in FIG. 3 such that this can re-join the main body of liquid. The uppermost threshold with level for the liquid within the tank is depicted by line X in FIG. 3.

By contrast, FIG. 4 is the effect of tapering the sensor in the opposite sense required by the present invention. Some droplets D have accumulated in the lowermost points of the shroud 22 and a film of liquid L is created in the regions either side of the depending portion 3. This time, capillary forces are acting in the opposite direction retain this liquid in place.

Similarly, in FIG. 5 where the surfaces of the depending portion 3 and shroud 22 are parallel, liquid again accumulates in the gaps 26. In both FIGS. 4 and 5, there is a significant amount of unwanted liquid in the vicinity of the electrodes 10 and this will interfere with the readings of the sensor. By contrast, the present invention leads this liquid to a well-defined location which is away from the electrodes such that this will be either not interfere at all or a much less significant and much more predictable extent.

The invention claimed is:

1. A capacitive liquid level sensor, the sensor comprising:
   a sensor body in the form a tongue with a freely depending portion extending to a distal tip at, in use, its lowermost end;
   a set of spaced capacitive electrodes extending along the tongue towards the distal tip, wherein, in use, when the distal tip of the tongue is immersed in a body of liquid, the capacitance between the electrodes changes depending on the depth of the body of liquid;
   wherein a width of the tongue increases in the direction towards the distal tip thereby defining a widest part of the freely depending portion of the tongue at least for part of the bottom half of the freely depending part of the tongue; and
   wherein the electrodes terminate short of the widest part of the freely depending portion of the tongue.

2. A sensor according to claim 1, wherein the tongue is flat.

3. A sensor according to claim 1, wherein the tongue is a printed circuit board.

4. A sensor according to claim 1, wherein the tongue has a connecting portion at the end opposite to the distal end by which it can be mounted.

5. A sensor according to claim 4, wherein the connecting portion is provided with electrical contacts.

6. A sensor according to claim 1, wherein the tongue is surrounded by a shroud.

7. A liquid sensor assembly comprising:
a capacitive liquid level sensor according to claim 1, the sensor comprising a sensor body in the form a tongue with a freely depending portion extending to a distal tip at, in use, its lowermost end, and a pair of spaced capacitive electrodes extending along the tongue towards the distal tip, wherein, in use, when the distal tip of the tongue is immersed in a body of liquid, the capacitance between the electrodes changes depending on the depth of the body of liquid;
the assembly further comprising a housing surrounding the tongue of the sensor wherein a gap between the sensor and the housing decreases in a downward direction for at least part of bottom half of the freely depending portion of the tongue.

8. An assembly according to claim 7, wherein the housing is provided by part of a tank and/or lid.

9. An assembly according to claim 8, wherein the gap between the sensor and the housing at its narrowest part is less than 6 mm or less.

* * * * *